L. E. DYKEMAN.
CANDY MAKING MACHINE.
APPLICATION FILED NOV. 26, 1919.
1,343,120. Patented June 8, 1920.
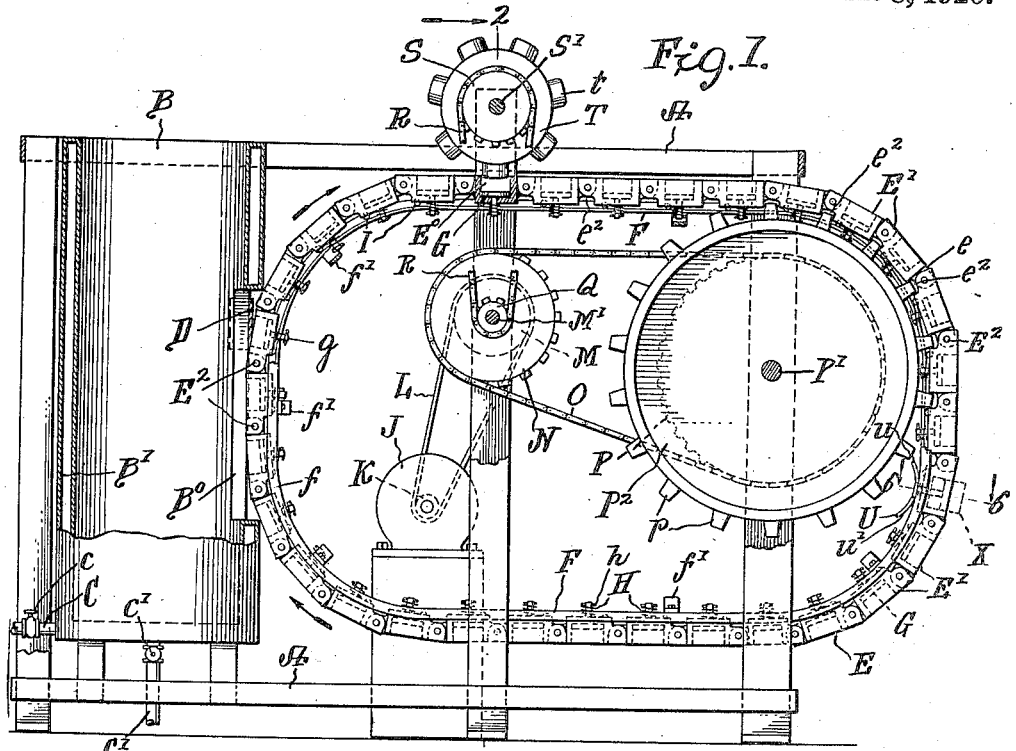
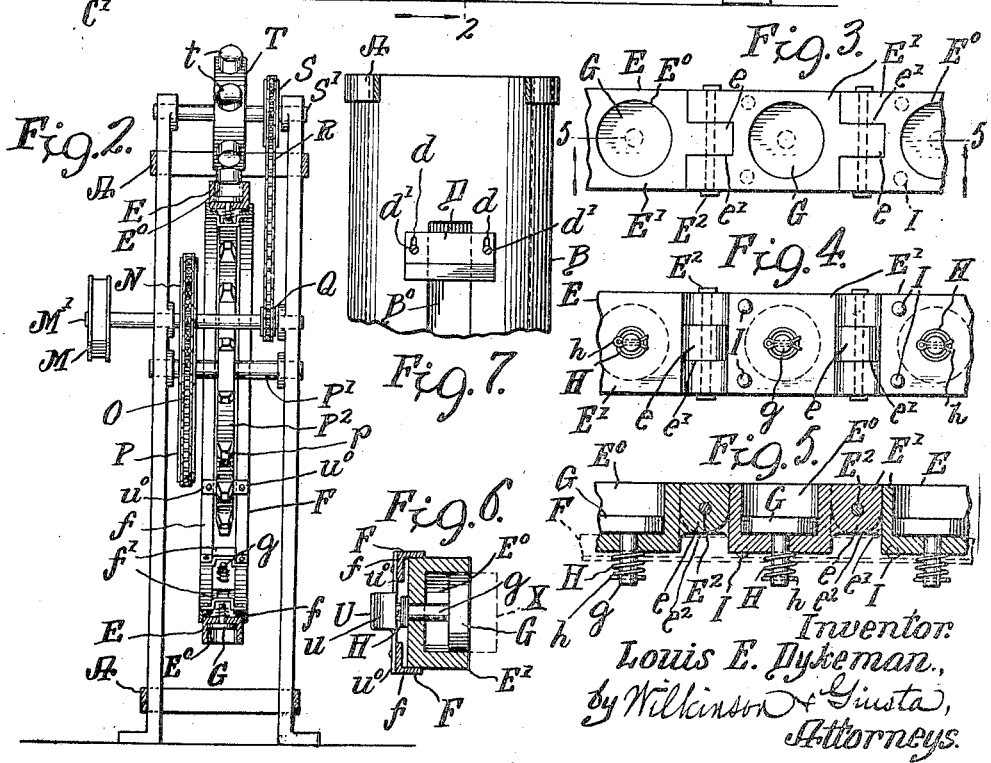
Inventor:
Louis E. Dykeman,
by Wilkinson & Giusta,
Attorneys.

UNITED STATES PATENT OFFICE.

LOUIS EDGAR DYKEMAN, OF NEW ORLEANS, LOUISIANA.

CANDY-MAKING MACHINE.

1,343,120. Specification of Letters Patent. Patented June 8, 1920.

Application filed November 26, 1919. Serial No. 340,700.

*To all whom it may concern:*

Be it known that I, LOUIS EDGAR DYKEMAN, a citizen of the United States, residing at New Orleans, in the parish of Orleans and State of Louisiana, have invented certain new and useful Improvements in Candy-Making Machines; and I do hereby declare the following to be a full, clear, and exact description of the invention, such as will enable others skilled in the art to which it appertains to make and use the same.

My invention relates to improvements in machines for making candy or other confections of which candy or a plastic sweet material is an ingredient.

The invention relates more especially to a machine for making that class of candies or confections which are designated as "molded" goods, which goods primarily consist of a composition containing more or less plastic material associated with some edible solid material in the divided form, such as popcorn, grated cocoanut, nut kernels in the whole or broken-up form, or the like.

It is the purpose of this invention to provide a machine which may be used to rapidly manufacture such a mixture of solid and plastic material into cakes or lumps of compressed material, each of predetermined shape and of a substantially predetermined weight.

According to my invention I provide an endless conveyer provided with a series of cups, exterior thereof, each cup being filled with the material and then the cups are passed *seriatim* beneath the compress which molds the contents of the cup into a solid mass, and this molded mass is automatically ejected after the cup has traveled a sufficient distance to allow the contents to become sufficiently cooled.

My invention will be more fully understood after reference to the accompanying drawings, in which like parts are indicated by similar reference symbols throughout the several views, and in which:—

Figure 1 shows a side elevation of the complete apparatus, parts being broken away.

Fig. 2 shows a section along the line 2—2 of Fig. 1, and looking in the direction of the arrows, parts being shown in elevation.

Fig. 3 is a plan view of adjacent links of the conveyer chain showing the cups formed therein.

Fig. 4 is an inverted plan view of the device shown in Fig. 3.

Fig. 5 shows a section along the line 5—5 of Fig. 3, and looking in the direction of the arrows.

Fig. 6 shows a section along the line 6—6 of Fig. 1, and looking in the direction of the arrows; and Fig. 7 is a detail showing a portion of the heated container in which the material to be molded is normally held, and shows the adjustable scraper carried thereby for leveling off the material formed from the top of each cup.

A, shown only in Figs. 1 and 2, represents the framework of any suitable design and of any suitable material on which the operative parts of the machine are mounted.

B represents the container to receive the mixture to be treated, which is preferably inclosed in a steam jacket B', into which steam or hot water may be forced through the pipe C, and from this steam jacket the condensed water may be drawn off through the drain pipe C'; the pipes C and C' being, of course, controlled by suitable valves $c$ and $c'$.

One side of the container B, including also the steam jacket B', is slotted as at B° to permit the feeding of the material into the cups, as will be hereinafter described, and at the top of this slot B° I provide an adjustable scraper D, slotted as at $d$ to receive the clamp bolts $d'$, as shown in Fig. 7, whereby the material projecting from the top of the cups may be scraped off as the conveyer E travels upward.

This conveyer E consists of a series of links E' connected together to form a practically closed outer face, as shown in detail in Fig. 3; each link being provided with a tongue $e$ engaging in a slot $e'$ in the adjacent link, and the pairs of links being connected together by means of pins $E^2$. Each link is provided with a chamber $E^0$ which serves as a mold for the contents thereof.

The backs of the links are recessed at their abutting ends to form sockets $e^2$, as shown in Fig. 5, to engage the teeth $p$ of the sprocket wheel P², which will be hereinafter more fully described.

These links travel along the tracks F which are preferably made of two angle irons $f$, and in order to lessen friction the various links are provided with balls I rotatably mounted in the faces engaging these angle iron, as shown most clearly in Figs. 3 to 5. In each cup E⁰ I provide a piston G having a stem $g$ projecting through the bottom of the cup, as shown in Figs. 5 and 6, and this piston is normally drawn against the bottom of the cup by means of the coil spring H engaging the cotter pin $h$ carried by the stem $g$, see Fig. 5.

The outer ends of these stems $g$ pass between the angle irons $f$ of the track F, and in order to permit these stems so to pass, and at the same time to bind the angle irons together, I use U-shaped links $f'$ connecting the two angle irons together, as shown in Figs. 1 and 2.

The machine is driven from any suitable source of power, such as an electric motor J, see Fig. 1, whose armature shaft carries the pulley K driving the belt L and the pulley M. Instead of an electric motor any suitable driving means may be employed. This pulley M is mounted on the shaft M', from which both the conveyer provided with the cups, and the compressor wheel for molding same, are simultaneously driven.

Suitable driving mechanism for the purpose just stated comprises the sprocket wheel N fast on the shaft M', driving the sprocket chain O which in turn drives the sprocket wheel P fast on the shaft P'. This shaft P' has fast thereon the sprocket wheel P², having the long tapered teeth $p$ engaging in the sockets $e^2$ between the links of the conveyer chain E, shown in Fig. 1. The shaft M' also carries a sprocket pinion Q, engaging the sprocket chain R, which drives the sprocket wheel S on the shaft S', to which the compressor wheel T is attached. This compressor wheel has a number of compression lugs $t$, and the motions of this wheel and of the conveyer E are so adjusted that these lugs $t$ will register seriatim with the corresponding cups E⁰ of the conveyer E.

The co-action of one of the cups and one of the compression lugs is indicated in Fig. 1. These lugs are preferably rounded on the edges, as shown, so as to provide the necessary clearance in the operation of the machine.

At some convenient location on the lower side of the apparatus I provide a cam arrangement U, shown in Figs. 1 and 6, which is connected to the angle irons $f$ by means of the cross piece $u^0$. This cam arrangement is provided with two cam faces $u$ and $u'$, the former of which engages the outer end of the stem $g$ of piston carried by each cup and presses the piston outward in the cup against the action of the spring H and empties the cup of the contents X indicated in dotted lines in Figs. 1 and 6. The cam $u'$ permits the spring H to ease the piston back to its initial position without snapping it back as would happen if no such additional arm were provided.

The operation of the device is as follows:

The mixture to be treated consisting, for instance, of popcorn mixed with "hard boiled" candy is placed in the container B where it is kept hot by the steam or hot water in the jacket B'. The conveyer being set in motion in the direction of the arrows, as each cup projects into the slot B⁰ it is filled with the material to be molded, either by the use of paddles or pushers, or other convenient utensils, operated by hand or in any convenient way, and the cups containing the material pass beneath the scraper D, where the material is leveled off even with the top of the cup, and then these cups pass seriatim beneath the compression lugs $t$ on the compressor wheel T, which compress the material into a solid cake.

During the further movement of the cup the material contained therein naturally cools until the candied contents become more or less hard, and finally the cup reaches the position shown at the right of Fig. 1, and also in Fig. 6, in which the stem of its piston engages the cam surface $u$ of the cam U. The piston is then forced outward, ejecting the solid contents of the cup and the same fall into a suitable chute or other receptacle, not shown.

It will thus be seen that the conveyer E moves the cups E⁰ continuously into the slot B⁰ where they are charged with the material to be molded, and then carries them to the compressor wheel T where the molding is effected, and then carries them to the ejecting cam where the contents of the cups are ejected.

While I have shown the cups of circular cross section adapted to manufacture the confections in cylindrical forms, it will be obvious that the shape of the cups and the corresponding shape of the compression lugs $t$ may be varied so that various shapes of the bodies formed may be provided for, if desired.

Incidental to the operation of the device it may be desirable from time to time to apply small quantities of butter or other lubricant to the various cups to prevent any of the candy from sticking to the inside of the cup when the contents of the cup are ejected.

It will be obvious that various modifications might be made in the construction, combination and arrangement of parts which could be used without departing from the spirit of my invention; and I do not mean to limit the invention to such details except as particularly pointed out in the claims.

Having thus described my invention what I claim and desire to secure by Letters Patent of the United States is:—

1. A candy making machine comprising a container surrounded by a heating jacket, and having a vertical slot in the side thereof, an endless conveyer provided with a series of blocks hinged together with cup-shaped recesses on the exterior thereof, the said conveyer projecting into and substantially closing said slot, means for compressing the material in said cups *seriatim*, and means for automatically ejecting the material from said cups *seriatim*, substantially as described.

2. A candy making machine comprising a container surrounded by a heating jacket, and having a vertical slot in the side thereof, an endless conveyer provided with a series of blocks hinged together with cup-shaped recesses on the exterior thereof, the said conveyer projecting into and substantially closing said slot, a compressor wheel provided with compression lugs adapted to project into said cups *seriatim* for compressing the material in said cups, means for simultaneously driving said conveyer and said compressor wheel, and means for automatically ejecting the material from said cups *seriatim*, substantially as described.

3. A candy making machine comprising a container surrounded by a heating jacket, and having a vertical slot in the side thereof, an endless conveyer provided with a series of blocks hinged together with cup-shaped recesses on the exterior thereof, the said conveyer projecting into and substantially closing said slot, a piston mounted in each cup and provided with a stem projecting through the bottom of said cup, a coil spring normally drawing the piston to the bottom of its cup, means for compressing the material in said cups *seriatim*, and a cam engaging the various piston stems *seriatim* and forcing these stems outward against the action of said springs, for automatically ejecting the material from said cups *seriatim*, substantially as described.

4. A candy making machine comprising a container surrounded by a heating jacket, and having a vertical slot in the side thereof, an endless conveyer provided with a series of blocks hinged together with cup-shaped recesses on the exterior thereof, the said conveyer projecting into and substantially closing said slot, a scraper adjustably mounted across the upper end of said slot for leveling the material fed into said cups, means for compressing the material in said cups *seriatim*, and means for automatically ejecting the material from said cups *seriatim*, substantially as described.

5. A candy making machine comprising a container surrounded by a heating jacket, and having a vertical slot in the side thereof, an endless conveyer provided with a series of blocks hinged together with cupshaped recesses on the exterior thereof, the said conveyer projecting into and substantially closing said slot, a scraper adjustably mounted across the upper end of said slot for leveling the material fed into said cups, a compressor wheel provided with compression lugs adapted to project into said cups *seriatim* for compressing the material in said cups, means for simultaneously driving said conveyer and said compressor wheel, and means for automatically ejecting the material from said cups *seriatim*, substantially as described.

6. A candy making machine comprising a container surrounded by a heating jacket, and having a vertical slot in the side thereof, an endless conveyer provided with a series of blocks hinged together with cup-shaped recesses on the exterior thereof, the said conveyer projecting into and substantially closing said slot, a scraper adjustably mounted across the upper end of said slot for leveling the material fed into said cups, a piston mounted in each cup and provided with a stem projecting through the bottom of said cup, a coil spring normally drawing the piston to the bottom of its cup, means for compressing the material in said cups *seriatim*, and a cam engaging the various piston stems *seriatim* and forcing these stems outward against the action of said springs, for automatically ejecting the material from said cups *seriatim*, substantially as described.

LOUIS EDGAR DYKEMAN.